(12) United States Patent
Waks et al.

(10) Patent No.: US 12,717,122 B2
(45) Date of Patent: Aug. 25, 2026

(54) METHODS AND SYSTEMS FOR HIGH-MAGNIFICATION PHOTOGRAPHY EXPLOITING REFLECTIVE POLARIZERS AND FARADAY ROTATORS

(71) Applicant: Lumenuity, Inc., Cabin John, MD (US)

(72) Inventors: Edo Waks, Cabin John, MD (US); Benjamin Shapiro, Los Angeles, CA (US); David Barsic, Los Angeles, CA (US)

(73) Assignee: Lumenuity, Inc., Cabin John, MD (US)

( * ) Notice: Subject to any disclaimer, the term of this patent is extended or adjusted under 35 U.S.C. 154(b) by 1 day.

(21) Appl. No.: 18/782,463

(22) Filed: Jul. 24, 2024

(65) Prior Publication Data

US 2025/0392803 A1 Dec. 25, 2025

Related U.S. Application Data

(63) Continuation of application No. PCT/US2023/011469, filed on Jan. 24, 2023.

(60) Provisional application No. 63/267,100, filed on Jan. 24, 2022.

(51) Int. Cl.

| | |
|---|---|
| ***H04N 5/335*** | (2011.01) |
| ***G02B 15/00*** | (2006.01) |
| ***G02B 27/28*** | (2006.01) |
| ***G02F 1/09*** | (2006.01) |
| ***H04N 23/55*** | (2023.01) |
| ***H04N 23/58*** | (2023.01) |

(52) U.S. Cl.

CPC ........... *G02B 15/00* (2013.01); *G02B 27/283* (2013.01); *G02B 27/286* (2013.01); *G02F 1/093* (2013.01); *H04N 23/55* (2023.01); *H04N 23/58* (2023.01)

(58) Field of Classification Search

CPC .................................................... G02B 27/286

See application file for complete search history.

(56) References Cited

U.S. PATENT DOCUMENTS

| | | | | |
|---|---|---|---|---|
| 10,401,299 | B2 * | 9/2019 | Ogawa | G01N 21/8806 |
| 11,750,907 | B2 * | 9/2023 | Waks | H04N 23/51 |
| 2022/0114706 | A1 * | 4/2022 | Waks | G06T 5/80 |
| 2023/0336858 | A1 * | 10/2023 | Waks | G02B 27/0018 |
| 2025/0172817 | A1 * | 5/2025 | Waks | H04N 23/672 |

* cited by examiner

*Primary Examiner* — Gary C Vieaux

(74) *Attorney, Agent, or Firm* — Leydig, Voit & Mayer, Ltd.

(57) ABSTRACT

Described herein are systems and methods for enabling small high-magnification cameras or imaging systems to operate in low-light (e.g. night time) conditions. These systems include the use of reflective polarizers and non-reciprocal elements (Faraday rotators) to enable a longer light path, and to enable light from an image to reach the sensor.

21 Claims, 4 Drawing Sheets

METHODS AND SYSTEMS FOR HIGH-MAGNIFICATION PHOTOGRAPHY EXPLOITING REFLECTIVE POLARIZERS AND FARADAY ROTATORS

CROSS-REFERENCE TO RELATED APPLICATION

This application is a continuation of International Patent Application No. PCT/US2023/011469, filed on Jan. 24, 2023 claims the benefit of U.S. Provisional Patent Application No. 63/267,100, filed Jan. 24, 2022, which is incorporated by reference herein in its entirety.

TECHNICAL FIELD

The application relates generally to the field of high-magnification photography and imaging techniques. More specifically, the invention relates to systems and methods that exploit polarizers and a non-reciprocal element or elements (e.g. a Faraday rotator), for use in high magnification cameras or imaging devices. The application also relates to imaging devices or cameras built into cell phones, smartphones, tablets, laptops, drones, or any other mobile devices.

BACKGROUND

Digital cameras are widely used in mobile devices, for example in smartphones. Camera performance is a major differentiator for consumers and is a driver for market share. Hence mobile device makers and suppliers strive to improve camera performance.

One key aspect of mobile device camera performance is high-magnification (or high-zoom) photography. Typically, cameras or imaging devices that achieve high-magnification photography have long and large lens assemblies (e.g. zoom lenses in DSLR cameras). But mobile devices are thin and compact and cannot contain long lens assemblies. This has traditionally limited their magnification and zoom capabilities.

SUMMARY

This application discloses systems and methods for improving the performance of high-magnification, low volume (e.g., thin) camera or imaging systems. Specific embodiments include the use of lenses, reflective polarizers, and at least one transmissive non-reciprocal optical element, such as a Faraday rotator. Doing so can increases the path of light in the camera, which enables longer focal lengths and hence higher magnifications. In some examples, it can do so without a significant loss of light. This enables, for example, high-magnification small-volume camera photography/videography in low-light conditions (e.g. at night time). It is also useful both for long-distance smartphone photography/videography, and also for near-in 'macro' photography/videography (which means taking high-magnification photos or videos of small but nearby objects, such as an ant on a leaf).

One aspect includes methods and systems for improving the performance of high-magnification small-volume (e.g. thin) cameras or imaging systems, which include internal reflections and polarizations as part of their operation. Such small but powerful magnification cameras are advantageous for smartphones, tablets, drones, and for other mobile devices, or for use in small confined spaces such as in unobtrusive locations in self-driving vehicles. Having internal reflections inside a small camera or imaging system enables a longer path of light, and hence allows use of longer focal lengths, which in turn enables higher magnification. In particular, this application discloses the use of polarizers, reflectors, and non-reciprocal elements (Faraday rotator) to improve performance, including for enabling operation in low-light conditions.

Another aspect includes an imaging system for capturing an image having a substrate having a focal length; a first reflective polarizer adjacent to the substrate; a second reflective polarizer downstream to the substrate; a non-reciprocal optical element between the first reflective polarizer and the second reflective polarizer; a sensor to form the image, wherein the substrate, first reflective polarizer, non-reciprocal element, second reflective polarizer, and sensor are arranged along an optical path. The light entering the substrate of the imaging system, is polarized by the first reflective polarizer, transmits through the non-reciprocal element and has its polarization rotated, is reflected from the second polarizer, returns through the non-reciprocal element and has its polarization further rotated, is reflected from the first reflective polarizer, transmits through the non-reciprocal element a third time and has its polarization rotated, and transmits through the second reflective polarizer to form an image on the sensor.

Another aspect includes a non-reciprocal optical element which is a Faraday rotator.

Another aspect includes a Faraday rotator which is arranged to provide 45° of polarization rotation.

Another aspect includes a system arranged to change the polarization of light during passage along a light path.

Another aspect includes the substrate is a lens.

Another aspect includes a second lens.

Another aspect includes one or more additional lenses or substrates having a focal length, wherein the one or more additional lenses or substrates have spherical or aspherical curved surfaces.

Another aspect includes cornering prisms or turning reflectors.

Another aspect includes the non-reciprocal element has two or more elements.

Another aspect includes a Faraday rotator has two or more elements.

Another aspect includes the focal length of the system matched to the round-trip length of the light path.

Another aspect includes one or more of the substrate, the reflective polarizers, the non-reciprocal optical element are moved mechanically to change the overall focal length of the imaging system.

Another aspect includes a smart device having the system.

Another aspect includes the smart device being a smartphone, cell phone, tablet, laptop, drone, or mobile device.

Another aspect includes an optical system for capturing an image having a lens having a focal length and having a curvature; a first reflective polarizer adjacent to the lens, wherein the reflective polarizer substantially reflecting light having a first polarization state and substantially transmitting light having an orthogonal second polarization state; a second reflective polarizer; a Faraday rotator between the first reflective polarizer and the second reflective polarizer; and a sensor to form the image. The substrate, first reflective polarizer, Faraday rotator, second reflective polarizer, and sensor are arranged along an optical path. Light entering the optical system, is polarized by the first reflective polarizer, transmits through the non-reciprocal element and has its polarization rotated, is reflected from the second polarizer, returns through the non-reciprocal element and has its polarization further rotated, is reflected from the first reflective polarizer, transmits through the non-reciprocal element a third time and has its polarization rotated, and transmits through the second reflective polarizer to form an image on the sensor.

Another aspect includes a camera having the system and an instrument such as a telescope, a monocular, a pair of binoculars, a camera or the like having a system or using the methods disclosed herein.

Another aspect includes a method for high magnification imaging including receiving light to enter a substrate having a focal length; polarizing the light; rotating the light in one direction, reflecting the light with the rotated polarization; rotating the light in the opposite direction relative to the first rotation; reflecting the light with the rotated polarization; rotating the light in the same direction as one of the prior steps; and transmitting the light into a sensor to capture an image.

DETAILED DESCRIPTION

This application will now be described more fully with reference to the accompanying drawings in which preferred embodiments of the invention are shown. This invention may, however, be embodied in many different forms and should not be construed as being limited to the embodiment set forth herein.

This application discloses compact small-volume cameras or imaging systems that make use of polarizing reflectors and at least one non-reciprocal element (such as a Faraday rotator). They enable both high-magnification and low-light operation. A key aspect herein is specific and innovative arrangements of the polarizers and selection of the properties of the non-reciprocal element, such as the Faraday rotator, between them. Specifically, the properties of the Faraday rotator are selected so that the polarization of the light is adjusted each time it passes back and forth through the Faraday rotator in such a way that, exactly when needed, each reflective polarizer acts either as a transmitter or a reflector. Specifically, the Faraday rotator correctly adjusts the polarization to pick the desired transmission or reflection behavior of the polarizer at each stage along the light path. Hence light is able to enter into the space between the polarizers, and due to the action of the Faraday rotator the polarizers then reflect it back and forth, and again due to the action of the Faraday rotator the light then exits to reach the imaging sensor and form an image.

At the end of this process, the amount of light reaching the sensor is high. Substantially most of the polarized light makes its way all the way from entry into the first polarizer, through the back-and-forth reflections, to exit from the second polarizer, and reaches the imaging sensor. The reflection of light back and forth enables a long light path length in a small camera, which permits a long focal length and hence enables high magnification. Since a substantial portion of the light can reach the sensor to form an image, that can enable operation at low light, e.g. at night time. Hence the resulting embodiments can enable small cameras or imaging systems that can achieve both high-magnification and low-light operation. Such cameras can be appropriate for use in smartphones, tablets, drones, or other mobile devices.

In current smartphone camera modules, typically there is one camera (the telephoto camera) that is responsible for high-magnification photography or videography; and another camera (e.g. the normal or wide-angle camera) is responsible for low-light operation, such as night-time operation. With the currently disclosed methods and systems, a single camera could take both high-magnification and low-light photographs or videos. This is desirable for smartphone and other mobile device uses, because it could reduce the size and cost of the camera module, while allowing the same or higher performance.

Figure 1:
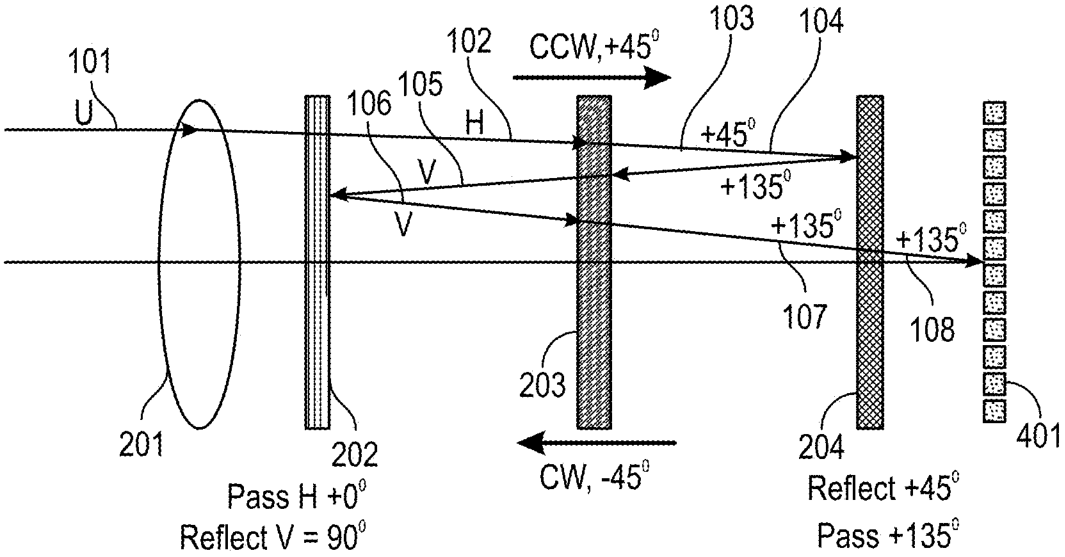
FIG. 1 shows an exemplary embodiment having a lens or focusing substrate (201), two polarizers (202, 204), a Faraday rotator (203) between them, and a sensor (401); which can enable high-magnification and low-light photography in cameras or imaging systems.

FIG. 1 shows an exemplary embodiment having a lens or focusing substrate (201), a first reflective polarizer (202), a Faraday rotator (203), a second reflective polarizer (204) whose orientation is selected such that it reflects light that is polarized along the direction which is +45 degrees relative the direction of the light transmitted by the first reflective polarizer, and an imaging sensor (401). The Faraday rotator is configured to rotate a linear polarization of light that passes through it (for a single pass, i.e. 102 to 103) by substantially +45 degrees. It rotates the polarization of linearly polarized light by +45 degrees (i.e. counterclockwise) for light moving from left to right (the rightward arrow and 'CCW, +45' degree label above 203 in FIG. 1); and it rotates the polarization of linearly polarized light by −45 degrees (i.e. clockwise) for light moving from right to left (the leftward arrow and 'CW, −45' degree label below 203 in FIG. 1).

The propagation of light through the exemplary system of FIG. 1 is now described in more detail. Light from an outside object or source or scene (101) enters the system through the entry lens (201). Such incoming light is typically not polarized (and so is labeled 'U' for unpolarized light in the figure). This light then enters the first linear reflective polarizer (202). The linear reflective polarizer only allows one orientation of linear polarization to transmit through it, while the other polarization reflects. The direction of linear polarization that transmits through the first reflective polarizer is labeled as horizontal (label 'H' for short at 102). The direction that reflects off the first polarizer is labeled as vertical ('V' for short). In typical imaging applications, the input light has no preferred polarization direction, so the orientation of the first polarizer can be chosen arbitrarily. But in some cases, the input light does have a preferred polarization direction. In such cases, we disclose that the orientation of the reflective polarizer can be selected to optimize the desired performance (e.g. optimal image quality, contrast, etc.) of the system.

The light (102) then enters the Faraday rotator (203), which can be composed of a material that exhibits a Faraday effect. The Faraday effect is a magneto-optic effect involving transmission of light through a material when a longitudinal static magnetic field is present. In the Faraday effect, the polarization of the light rotates about the propagation vector of the light ray. The direction of the rotation depends on the direction in which the light propagates through the material. For example, if light propagates left to right, polarization can rotate counterclockwise about the propagation vector. If light propagates right to left, in this example it will then rotate clockwise. This difference in behavior due to the light propagating one direction versus the other is a manifestation of the non-reciprocal properties of the Faraday effect. The Faraday effect exhibits broken time-reversal symmetry, which means the behavior of the light can depend on which direction light passes through the material.

In FIG. 1, the light's linear polarization rotates counterclockwise when light is moving from left to right, and clockwise when light is moving from right to left. But it should be understood that this is only an exemplary case, and light could undergo the reverse rotation depending on the selected properties of the Faraday material, as well as based on the direction of the applied external magnetic fields or of an internal magnetization. In our exemplary case, the properties of the Faraday rotator are selected to rotate the linear polarization by substantially +45 degrees for left-to-right progressing light. Thus when light (103) exits the Faraday rotator it now has a linear polarization oriented at substantially +45 degrees (hence 103 is labeled with +45 degrees).

FIG. 1 further shows the second reflective polarizer (204). The light 103 that is linear polarized at +45 degrees will reflect, and will return as light 104. Upon reflection from the second polarizer (204), the direction of the light propagation vector reverses, but the direction of the polarization electric field remains the same. This results in the linear polarization vector undergoing a reflection about the vertical (V) direction. Hence the polarization flips from +45 degrees linear polarization (for 103) to +135 degrees linear polarization (for 104) after the reflection from the reflective polarizer (204).

This (104) light with its +135 degree linear polarization now re-enters the Faraday rotator (203). Due to the non-reciprocal nature of the Faraday effect, the Faraday rotator now rotates the light in the clockwise direction by 45 degrees (i.e. by −45 degrees), which rotates +135 to +90 degrees polarization. Hence, for light 105, the linear polarization vector is now oriented at +90 degrees (relative to the horizontal 'H' polarization), and it is therefore a vertically oriented linear polarization ('V' for short at 105).

Since the first polarizer was selected to be oriented such that it substantially reflects vertically polarized light, the light (105) will substantially reflect from the first reflective polarizer. For this reflected 106 light, the linear polarization will again undergo a reflection about the vertical direction. But since the polarization direction is already lying along the same direction as the reflection axis, it undergoes no change. Hence 106 is also vertically polarized (label 'V' at 106).

This light (106) then enters the Faraday rotator (203) again. On this third pass of light through the Faraday rotator, the Faraday rotator again rotates the linearly polarized light counterclockwise. Thus when light (107) exits the Faraday rotator (203) it now has a linear polarization oriented at substantially +90+45=+135 degrees.

As indicated before, the second reflective polarizer is oriented such that it substantially reflects +45 degree polarized light. A reflective polarizer that reflects +45 degree linear polarization will substantially transmit an orthogonal +135 degree linear polarization. Hence the second reflective polarizer (204) will transmit light 107 with its +135 degree linear polarization orientation. Thus, when light 107 hits the second polarizer (204), it will substantially transmit (108) and reach the imaging sensor (401) to form an image.

Thus, the selected Faraday rotator (203) applied exactly those rotations to the linear polarizations so that the light path will be reflected one round trip between the two polarizers (102, 103, 104, 105), but then on its third leg (106, 107, 108) will exit to the sensor (401). This arrangement can allow a longer light path in a small camera, which supports a longer focal and thus higher magnification.

Further, the enabled transmissions and reflections from the two polarizers can be efficient. Due to the polarization rotation applied by the Faraday rotator, when a transmission is needed (107 to 108) then the polarizer (204) will transmit the majority of that light, and when a reflection is needed (103 to 104, and 105 to 106) then the first or second polarizer respectively (202, 204) will reflect the majority of that light. Hence a substantial amount of (the horizontally polarized) light coming into the camera (101) makes its way along the light path (102, 103, 104, 105, 106, 107, 108) and can reach the imaging sensor (401). Since a substantial amount of incoming light reaches the sensor, this can enable operation at low-light (e.g. at night time).

The system can equally operate if the signs or direction of rotation are flipped. If the Faraday rotator (203) rotates the linear polarization of light by substantially −45 degrees (i.e. now rotates it clockwise instead of counterclockwise), and if the second polarizer (204) has a reflect polarization direction that is oriented at substantially a −45 degree angle to the first polarizer (instead of +45 degrees as before), then the embodiment will remain operable. Also, the entire assembly can be rotated by any arbitrary angle, which equivalently corresponds to choosing the orientation of what is labeled as horizontal polarization.

In another embodiment, the system can operate when the size of the Faraday rotation is smaller than 45 degrees. Suppose the Faraday rotator rotates the linear polarization by an angle beta, where for example beta is substantially 40 degrees, 35 degrees, 30 degrees, etc., or some other angle smaller than 45 degrees. In this case, we would select the angle between the transmit polarization orientation of the first reflective polarizer and the reflect polarization orientation of the second reflective polarizers to be beta. The system would work in the same way, but with a reduction in the total amount of light reaching the sensor (i.e. a reduction in the efficiency of the imaging system).

The Faraday rotator element (203) can be composed of a material that exhibits circular polarization birefringence. It may be composed of, but not limited to, doped glasses, thin films, or other material with a high Verdet constant. (The Verdet constant is an optical property of a material that describes the strength of the Faraday effect in that material.) The Faraday effect is a magneto-optic effect involving transmission of light through a material when a longitudinal static magnetic field is present. Thus the Faraday rotator may include surrounding magnets, magnetic materials, electrical wiring, or other components that apply the appropriate magnetic field, to enable a polarization rotation through the width of the Faraday rotator.

Magnetless Faraday rotators are also possible. For such a Faraday rotator, no external magnet or external magnetic material is needed. Instead, the magnetic field is present inside the Faraday material itself. This can be achieved by doping the material with magnetic impurities, or embedding magnetized elements (e.g. magnetized micro or nano particles, wires, or other features) in the material. Or the material could exhibit magnetization latching and have been pre-magnetized. Some examples of Faraday materials include thin-film crystal, organic, and inorganic materials that have been developed to act as Faraday rotation materials. There are organic or polymer films with magnetic additives that can act as Faraday materials. And there are other methods known in the art to create Faraday rotations. We herein disclose that the Faraday rotator can be constructed from any of the methods above, either with or without an external magnet or magnetic materials.

In other embodiments, one, some, or all of the elements in FIG. 1 could be implemented as multiple elements acting together to perform one function. For example, any single lens or focusing substrate can be replaced by a group of lenses or substrates. Further, the Faraday rotator (203) could be composed of multiple rotators or multiple layers, for example each of which achieves part of the desired rotation. It may or may not include other elements which enable Faraday rotations, such as magnetic elements, specific materials or films which enable Faraday rotations. And also it may include tuning elements (e.g. such as tuning by voltage, magnetic field, or temperature) which would enable tuning the amount of Faraday rotation.

Figure 2:
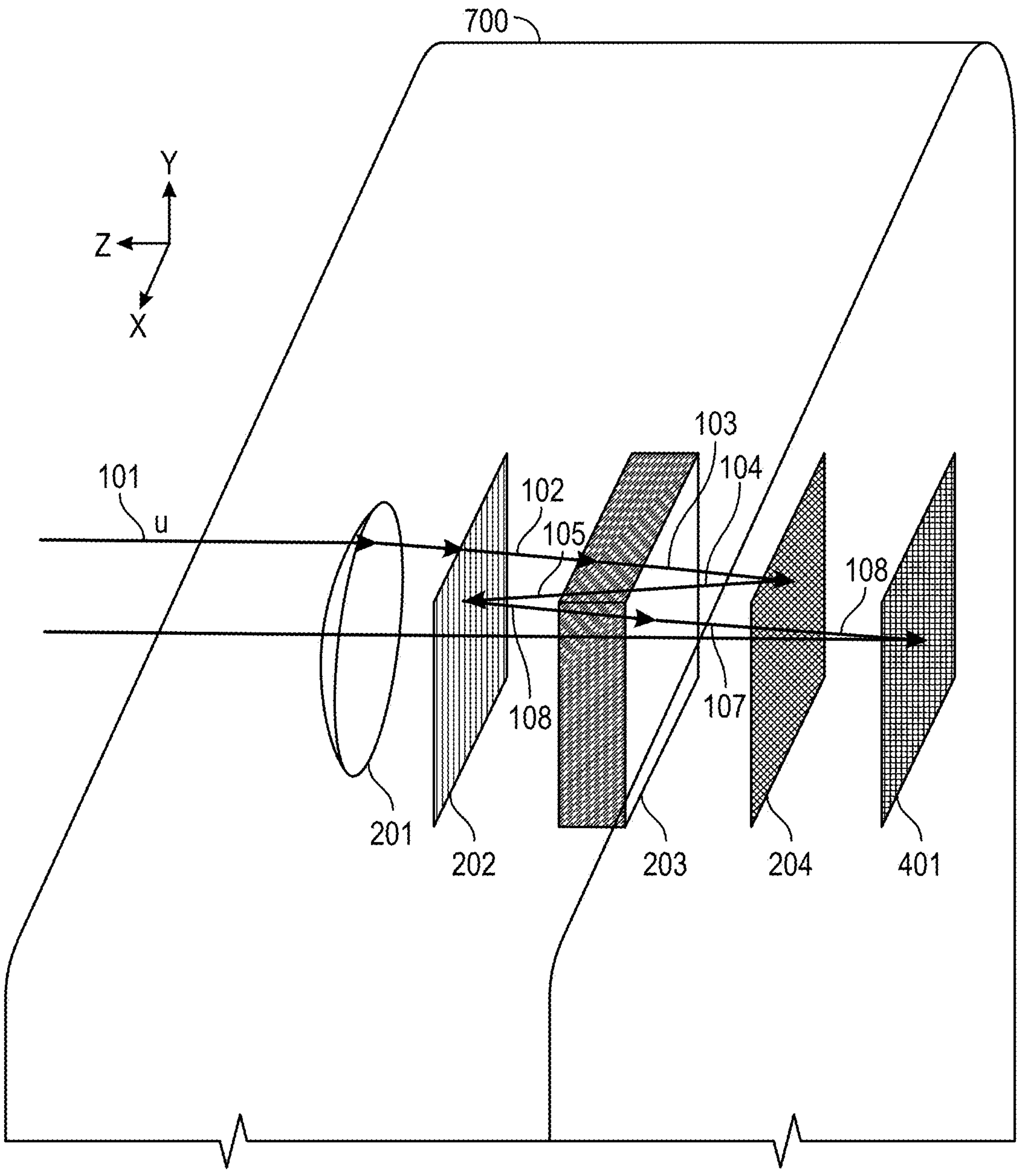
FIG. 2 shows the embodiment of FIG. 1 integrated into an exemplary smartphone.

FIG. 2 shows an exemplary type of camera or imaging system that can be used inside a smartphone, tablet, laptop, or other mobile device. This is the exemplary system of FIG. 1, but now shown in more detail as its elements could be oriented inside a smartphone. It is composed of a lens or focusing substrate (201); adjacent to which is a first reflective polarizer (202) whose orientation is selected to transmit horizontally polarized light, and hence to reflect vertically polarized light; adjacent to which is the Faraday rotator (203) described above; adjacent to which is a second reflective polarizer (204) whose orientation is arranged at −45 degrees to the first reflective polarizer, hence it is selected to reflect +45 degree polarized light, and hence will transmit +135 degree linearly polarized light; adjacent to which is an imaging sensor (401). These elements are arranged substantially along the optical path of the camera (along incoming ray 101, i.e. sequentially along the −Z axis in FIG. 2), and their orientation is substantially perpendicular to this axis or light path (meaning, they are oriented along the XY plane in FIG. 2).

As can be seen in FIG. 2, the exemplary system can be used in a smartphone to orient the optical axis of the camera (along 101) through the thickness of the smartphone. This arrangement can allow up to doubling-up the light path length (and hence focal length) available across the thickness of the phone. FIG. 2 shows such a case: the optical axis of the camera (along the incoming light path 101) can be aligned along the thinnest part of the phone (along the −Z axis in FIG. 2). The resulting path and polarization of the light through the camera remains the same as previously described for FIG. 1.

Figure 3:
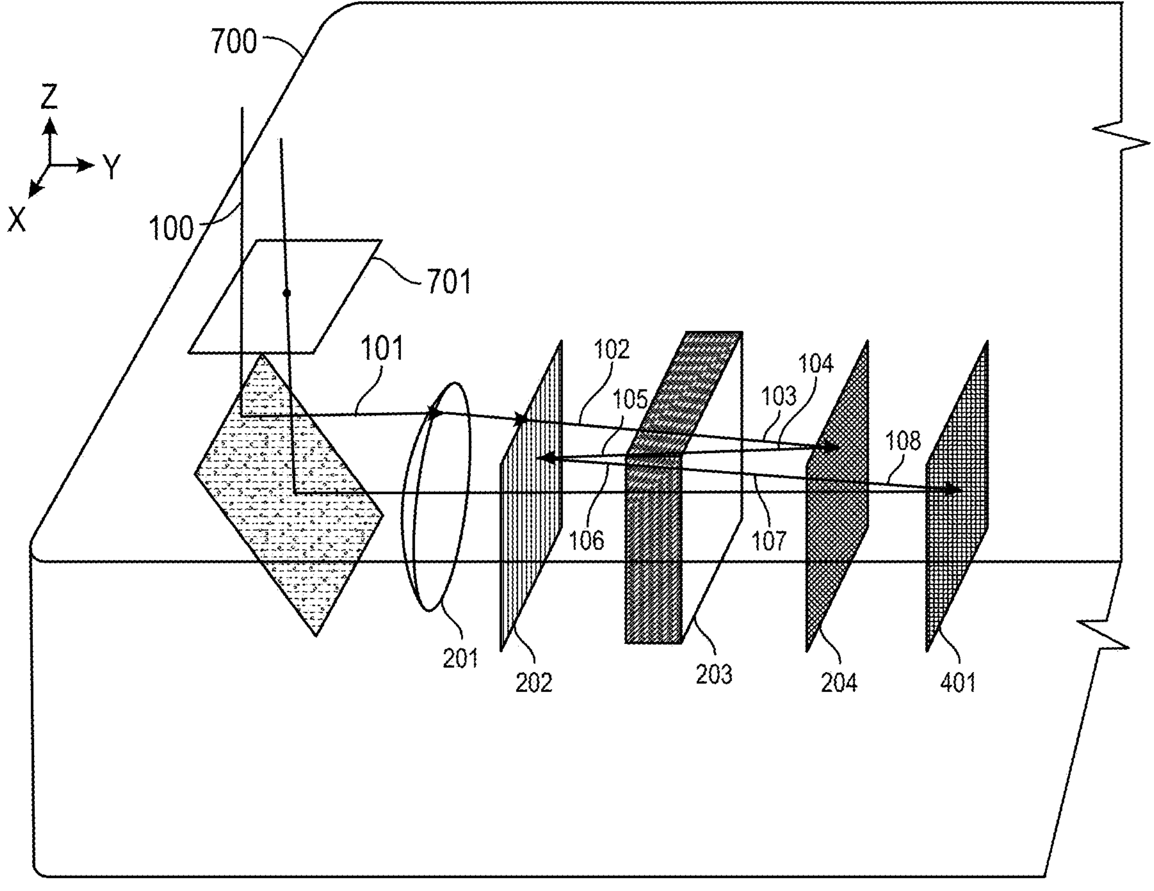
FIG. 3 shows an alternate embodiment of FIG. 1, also having a turning mirror or cornering prism (200), integrated into an exemplary smartphone.

A second way the invention can be used is in combination with a periscope geometry. The invention illustrated in FIG. 1 may further include a cornering mirror or prism before or after lens 201, as illustrated in FIG. 3 for the case where a cornering mirror (200) is before lens 201. In this embodiment, the aperture 701 can also be replaced by a lens or lenses if desired. Such a design, where the embodiment of FIG. 1 is used in a ‘periscope’ configuration, has an advantage over existing smartphone periscope camera designs. In an existing periscope design, the focusing path length available to the light is no more than the length of the long axis of the camera (along the Y axis in FIG. 3). This sets the available focal length, and hence the maximum magnification, of a conventional smartphone periscope camera. In the embodiment shown in FIG. 3, due to the polarizing reflectors (202 and 204) and the Faraday rotator (203), up to almost double the length of the long axis of the camera is available for light travel, and hence for focusing and magnification.

In the current exemplary embodiment of FIG. 3, the light enters the smartphone along the −Z axis (ray 100) through aperture 701 (which can also be a lens, or a lens group, or a focusing substrate or substrates), and is turned substantially 90 degrees by a turning mirror (200) or equivalently a cornering prism. The lens (201) can remain after the turning mirror or cornering prism (as shown in FIG. 3), or it can be placed before the turning mirror or cornering prism, in or near aperture 701. The light then proceeds through the embodiment the same way as shown in and discussed for FIG. 1 (see light path 101 to 108 in FIG. 1).

Other optical elements can be added to the embodiments, for instance to further improve performance. For example, in order to reduce imaging aberrations, one or multiple lenses or focusing substrates may be added with spherical or aspherical surfaces; before, between, or after the polarizers and Faraday rotator.

It is also possible to add in cornering mirrors or cornering prisms, for example immediately before or immediately after a first lens or focusing substratee, so that the light path is bent by substantially 90 degrees. This can allow the imaging system to operate along the length (rather than the width) of a mobile device, and thereby can further increase the available length for the light path.

In all of the above embodiments: a single lens or focusing substrate can be replaced by a lens group or a group of focusing substrates; or additional lenses can be added before or between the other elements. An aperture, e.g. aperture 701 in FIG. 3, may also be replaced by a lens or lenses. Or, vice versa, the first lens, e.g. lens 201 in the figures, can be replaced by an aperture and needed lenses can be placed after the aperture.

It is disclosed that elements or their surfaces may be curved, instead of flat. Or curved optical surfaces may be placed before or after disclosed elements. Specifically, mirrors or mirrored surfaces may be curved, either spherically or aspherically. If such components are available, one, some, or all of the polarizers, or the Faraday rotator, may be curved or shaped, instead of remaining flat. Overall, one, some, or many elements can be curved, or can have curved surfaces, or can have curved optical elements before or after them.

It is disclosed that any of the optical elements in the embodiments may be moved over time, e.g. translated or tilted, or for some element types their shape may be adapted over time. Such motion or shape change is commonly used to change focus in cameras and imaging systems, and/or to correct for video jitter, and we disclose that the same can be used in the systems disclosed herein. There are many ways to affect such motion, including piezo, electrostatic, magnetic, motor actuated rack-and-pinion, MEMS (micro-electro-mechanical system) actuators, or other types of actuation. Including such movement is disclosed for our embodiments.

Figure 4:
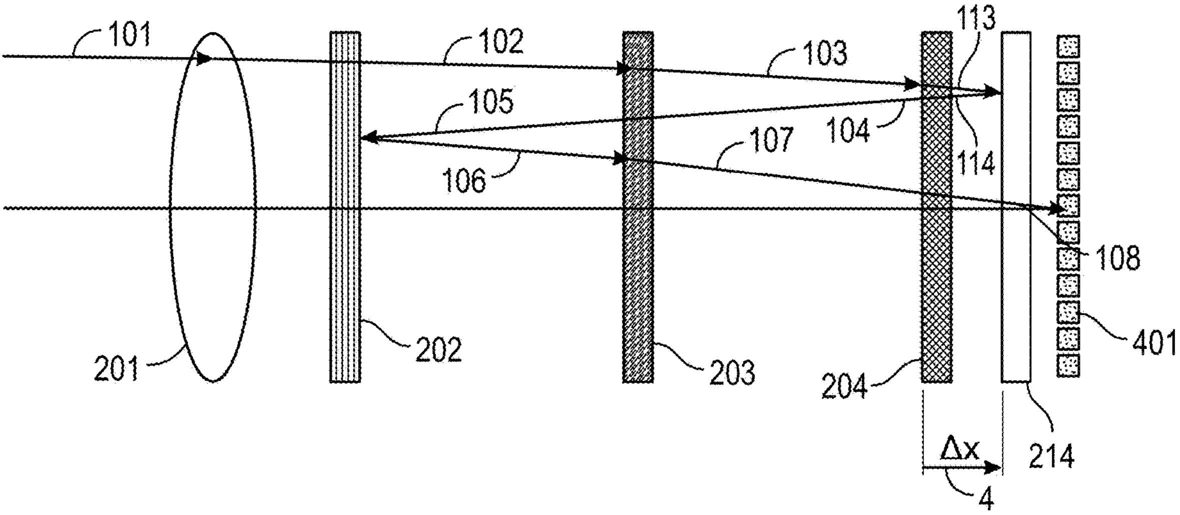
FIG. 4 shows an advantage for optical element motion as it relates to varying focusing, for the disclosed embodiments.

FIG. 4 shows another embodiment aspect for improved performance. If polarizer 204 is moved to the right by an amount $\Delta X$, then the change in light path length is double that amount, is $2\ \Delta X$. This is illustrated in FIG. 4. For the polarizer motion $\Delta X$ (label 4), the light from lens (201) to sensor (401) traverses the distance the mirror has displaced twice over. It traverses it in the forward direction (added light path 113), and again in the return direction (added light path 114).

As shown, there is no third amplification of $\Delta X$. For the third pass of light, for 107, 108: the added distance $+\Delta X$ to the right from 204 to 214 is canceled by the reduced distance-AX from 214 to 401. Hence the distance from 202 to 401 along 106, 107, 108 remains the same even if 204 is moved. But, it is disclosed that if the polarizer (204) and the sensor (401) are moved together as one unit by ΔX, then the distance from 202 to 401 is also increased by +ΔX. Hence now there is a 3 ΔX benefit for a ΔX motion of a unit. The 2 ΔX benefit shown in FIG. 4, and the added +ΔX distance from 204 to a 401.

The above double-the-motion or triple-the-motion benefit is advantageous for small camera applications, including for cameras in smartphones and other mobile devices. In such cameras, the amount of space available for element motion is limited. Thus extracting more change in light path and hence more focusing change, from the same amount of element motion, is highly desirable. The above advantage was presented in the context of the embodiment of FIG. 1, but it is also true for other embodiments herein.

In FIGS. 1 to 4, there is free space shown between the components. But this is done primarily for purposes of illustration clarity, so that the reader can easily see all components of the invention. We note that this free space can be retained, or the components may be brought closer together, as close as is desired or as is allowed by manufacturing or other considerations, and doing so is anticipated and disclosed.

The disclosed embodiments have been selected to enable low-light operation, in addition to high-magnification. Low-light has been achieved by inventively selecting designs that deliver a substantial portion of the light to the sensor, e.g. almost all light of one type of polarization. We note that delivering a substantial amount of light to the sensor enables a better signal-to-noise ratio. When there is more light reaching the sensor, the signal from the object or scene is higher compared to the dark noise level of an imaging sensor (dark noise is the amount of sensor noise when there is no light reaching the sensor). By keeping the amount of light reaching the sensor at a high level, signal-to-noise is increased, and this in turn enables the camera to operate successfully with less light, i.e., at lower light levels.

For all of the embodiments: we disclose that there are different names for and/or versions of the components that can be used, and that the present disclosure anticipates and includes such use. Specifically, polarization elements may include but are not limited to: thin film polarizers, micro wire-grid polarizers, wave-plates, liquid crystal rotators, Fresnel rhombs, and similar devices. One or more of the polarizers can be adjustable polarizers, such as liquid crystals polarizers whose polarization orientation may be changed by applying voltages.

The imaging sensor can be a time-integrating sensor, a CCD (charge-coupled device) sensor, a CMOS (complementary metal oxide semiconductor) sensor, avalanche photodiode arrays, photomultiplier arrays, nano-particle or nano-material based sensors, grayscale or color sensors, any type of sensor used in smartphone or mobile device cameras, or any other type of sensor.

It is understood that various stated numbers are not exact values, but can have variations. For instance, a plus or minus 45-degree polarization rotation can have variations. Specifically, the amount of rotation need not be exactly 45 degrees, both for reasons of light optics (light at different incidence angles, or at different wavelengths of light will undergo different phase shifts) and for engineering or manufacturing reasons (variations in Faraday rotator thickness, materials, and other manufacturing variations) which will also introduce changes in the amount of rotation. The current disclosure covers such variations away from an "ideal" 45 degree polarization rotation, both for unavoidable reasons (such as above) or for intended reasons if the system designer wishes to change the phase to accommodate system constraints. Other similar cases are also similarly covered, and are understood to be example or approximate numbers.

Some numbers are also understood to include their logical opposing sign counterpart. For example, a person knowledgeable in the field of optics will recognize that the systems disclosed herein will work equally well if +45 degrees is replaced by −45 degrees, so long as the embodiment interrelation between polarizations and Faraday rotations is kept self-consistent. Likewise, for polarization in general, there are changes in sign or via the addition of an overall positive or negative phase, that will not change system operation. Such replacements are understood to be anticipated, and are covered by the present disclosure.

For example, in relation to FIGS. 1 to 4, the embodiments could operate equally well if the polarizer and other components were chosen so that each horizontal polarization (label 'H' in the figures) was replaced by vertical polarization ('V'), and vice versa. For example, in FIG. 1, the polarizer 202 could be so oriented that 102 is vertically linearly polarized ('V' instead of 'H'), then the return path 105 would be horizontally ('H') polarized. It would still be the case that the light exiting and returning to the polarizer (202) would still differ by 90 degrees, hence the overall path of the light and system operation would remain as shown in FIG. 1 (except every 'H' would be replaced by a 'V', and vice versa; and the +45 and +135 entries would be adjusted appropriately). In this sense, changing the orientation of the polarizer (202) by 90 degrees would leave the system operational, and is anticipated and disclosed.

Changing the orientation of the first reflective polarizer (202) by any other angle that is not 90 degrees, so long as the orientation of the second reflective polarizer (204) is likewise adjusted, will also leave the system operational. Any such change is understood to be the addition of an overall orientation angle, and can be selected as desired (for example to align polarization at the sensor with an axis that is convenient for design of the system, or if the incoming light is polarized to optimize the system performance with respect to polarization of the incoming light). Such a change to the system is understood and disclosed for the embodiment of FIG. 1, as well as for all other embodiments disclosed in this invention.

Phase-shifted combinations of linear polarization states will create what is termed circular polarization states. Circular polarization can be left-handed (rotating counterclockwise as the beam propagates) or right-handed (rotating clockwise). It is disclosed that left and right hand polarization states are orthogonal and can therefore also be used as polarization states in the disclosed invention, similar to how horizontal and vertical linear polarization are used. There are also elliptical polarization states that are neither fully linearly nor fully circular, but are a combination. The elliptical polarization states are also contemplated in the current invention, and may also be used. It is known that a Poincare sphere can be used to represent polarization states, and any polarization (linear, circular, or elliptical) can be represented on this sphere. We disclose that linear and circular polarizations are just specific special cases, and that more generally the inventions disclosed herein can use polarizations that are anywhere on the Poincare sphere and that are, for example, substantially orthogonal relative to each other, or that occupy points that are not immediately adjacent on the Poincare sphere.

It is further disclosed that there are many known ways to practically accomplish some of the elements listed as components in the disclosed embodiments. For example, lenses or focusing substrates can be made from glass or plastic or other materials. They can be made using traditional grinding and polishing, single point-diamond turning, molded, 3D printed, or lithographically defined. In addition, lenses or focusing substrates can also be made through the use of holography, diffractive optics, gratings, two and three-dimensional photonic crystals, meta-lenses that use micro-structured metal and dielectric materials as well as gradient index materials. Polarizers can be made from a variety of materials, such as polymer material with oriented polymer chains like Polaroid polarizers, liquid crystal materials, oriented elongated metallic nanoparticles embedded in glass, crystal or polymer, Fresnel reflection from dielectric surfaces, birefringent crystalline materials, thin film and micro-scale wire grid materials, or other materials.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. An imaging system for capturing an image comprising:
- a substrate having a focal length;
- a first reflective polarizer adjacent to the substrate;
- a second reflective polarizer downstream to the substrate;
- a non-reciprocal optical element between the first reflective polarizer and the second reflective polarizer;
- a sensor to form the image, wherein the substrate, first reflective polarizer, non-reciprocal element, second reflective polarizer, and sensor are arranged along an optical path,
- whereby light entering the substrate of the imaging system, is polarized by the first reflective polarizer, transmits through the non-reciprocal element and has its polarization rotated, is reflected from the second polarizer, returns through the non-reciprocal element and has its polarization further rotated, is reflected from the first reflective polarizer, transmits through the non-reciprocal element a third time and has its polarization rotated, and transmits through the second reflective polarizer to form an image on the sensor.

2. The system of claim 1, wherein the non-reciprocal optical element is a Faraday rotator.

3. The system of claim 2, wherein the Faraday rotator is arranged to provide 45° of polarization rotation.

4. The system of claim 1, wherein the system is arranged to change the polarization of light during passage along a light path.

5. The system of claim 1, wherein the substrate is a lens.

6. The system of claim 1, further comprising a second lens.

7. The system of claim 1, further comprising one or more additional lenses or substrates having a focal length, wherein the one or more additional lenses or substrates have spherical or aspherical curved surfaces.

8. The system of claim 1, further comprising cornering prisms or turning reflectors.

9. The system of claim 1, wherein the non-reciprocal element has two or more elements.

10. The system of claim 2, wherein the Faraday rotator has two or more elements.

11. A system as claimed in claim 10, wherein the lens, the first reflective polarizer, the second reflective polarizer, and the Faraday rotator are substantially along the optical path and parallel.

12. The system in claim 1 wherein the focal length of the system is matched to the round-trip length of the light path.

13. The system in claim 1, wherein one or more of the substrate, the reflective polarizers, the non-reciprocal optical element are moved mechanically to change the overall focal length of the imaging system.

14. A smart device having the system of claim 1.

15. The smart device of claim 14, wherein the smart device is a smartphone, cell phone, tablet, laptop, drone, or mobile device.

16. A camera having the system of claim 1.

17. An optical system for capturing an image comprising:
- a lens having a focal length and having a curvature;
- a first reflective polarizer adjacent to the lens, wherein the reflective polarizer substantially transmits light having a first polarization state and substantially reflecting light having an orthogonal second polarization state;
- a second reflective polarizer;
- a Faraday rotator between the first reflective polarizer and the second reflective polarizer;
- a sensor to form the image, wherein the substrate, first reflective polarizer, Faraday rotator, second reflective polarizer, and sensor are arranged along an optical path;
- whereby light entering the optical system, is polarized by the first reflective polarizer, transmits through the non-reciprocal element and has its polarization rotated, is reflected from the second polarizer, returns through the non-reciprocal element and has its polarization further rotated, is reflected from the first reflective polarizer, transmits through the non-reciprocal element a third time and has its polarization rotated, and transmits through the second reflective polarizer to form an image on the sensor.

18. A camera having the system of claim 17.

19. An instrument comprising the system of claim 18.

20. An instrument as claimed in claim 19, comprising any one of a telescope, a monocular, a pair of binoculars and a camera.

21. A method for high magnification imaging, the method comprising:
- a. receiving light to enter a substrate having a focal length;
- b. polarizing the light;
- c. Rotating the light in one direction;
- d. Reflecting the light with the rotated polarization;
- e. Rotating the light in the opposite direction relative to the first rotation;
- f. Reflecting the light with the rotated polarization;
- g. Rotating the light in the same direction as step c; and
- h. Transmitting the light into a sensor to capture an image.

* * * * *